United States Patent
Krishnakumar et al.

(10) Patent No.: US 10,061,934 B2
(45) Date of Patent: Aug. 28, 2018

(54) ACCESS TO A WEARABLE COMPUTING SYSTEM USING RANDOMIZED INPUT ORIGINS

(71) Applicant: Avaya Inc., Basking Ridge, NJ (US)

(72) Inventors: Anjur Sundaresan Krishnakumar, Princeton, NJ (US); Shalini Yajnik, Berkeley Heights, NJ (US)

(73) Assignee: Avaya, Inc., Santa Clara, CA (US)

( * ) Notice: Subject to any disclaimer, the term of this patent is extended or adjusted under 35 U.S.C. 154(b) by 0 days.

(21) Appl. No.: 14/880,865

(22) Filed: Oct. 12, 2015

(65) Prior Publication Data

US 2017/0103222 A1    Apr. 13, 2017

(51) Int. Cl.
*H04L 29/00*     (2006.01)
*G06F 21/62*    (2013.01)
*H04L 29/06*    (2006.01)
*H04W 12/08*   (2009.01)
*H04W 4/80*    (2018.01)

(52) U.S. Cl.
CPC ........ *G06F 21/6218* (2013.01); *H04L 63/102* (2013.01); *H04W 4/80* (2018.02); *H04W 12/08* (2013.01); *H04L 63/108* (2013.01)

(58) Field of Classification Search
CPC ............................ G06F 21/6218; H04L 63/102
USPC .......................................................... 726/19
See application file for complete search history.

(56) References Cited

U.S. PATENT DOCUMENTS

2014/0089672 A1\* 3/2014 Luna .................... H04L 9/3231
                                                                      713/186
2015/0028996 A1\* 1/2015 Agrafioti ................ G06F 21/40
                                                                        340/5.82

OTHER PUBLICATIONS

Daniel V. Bailey et al., "'Typing' Passwords With Voice Recognition: How to Authenticate to Google Glass" Horst Görtz Institute for IT-Security, Bochum, Germany, 2 pages.

\* cited by examiner

*Primary Examiner* — Brandon Hoffman
*Assistant Examiner* — Michael D Anderson

(57) ABSTRACT

Embodiments disclosed herein provide systems, methods, and computer-readable media for accessing a wearable computing system using randomized input origins for user login. In a particular embodiment, a method provides presenting a user with a first origin on which user login information is based, wherein the first origin is randomly selected from a plurality of possible origins. The method further provides, receiving first motion information from the user indicating a first position relative to the first origin that corresponds to a first element of the user login information. Upon receiving the user login information, the method provides determining whether the user login information authorizes the user to access the wearable computing system.

20 Claims, 6 Drawing Sheets

ACCESS TO A WEARABLE COMPUTING SYSTEM USING RANDOMIZED INPUT ORIGINS

TECHNICAL FIELD

Aspects of the disclosure are related to wearable computing systems and, in particular, to providing secured access to wearable computing systems.

TECHNICAL BACKGROUND

Computing devices are now compact enough that they can be easily carried or even worn by their users. Form factors such as watches or bracelets and headsets or glasses are becoming more common. These form factors allow a user to easily carry their devices almost anywhere. However, in many cases, the type of input allowed by these devices is limited by the form factor that they take. For example, a watch face is quite small and does not allow much room for touch input. Likewise, a headset may not have any type of input outside of voice recognition and a couple buttons. Voice recognition in particular is not a private way of entering information since others can potentially hear the input. Moreover, in noisy situations, voice input may not be interpreted accurately by the wearable device.

The lack of input options on many wearable devices makes it difficult to provide input for some purposes. One of those purposes is input as part of device security (e.g. password protecting the device). As such, many manufacturers or users may choose to eschew device security to avoid difficulties. Therefore, even if a user's phone or computer is protected, that user's unsecured wearable device may provide access to much of the same information (e.g. emails, documents, etc.) and is vulnerable should it fall into the wrong hands.

OVERVIEW

Embodiments disclosed herein provide systems, methods, and computer-readable media for accessing a wearable computing system using randomized input origins for user login. In a particular embodiment, a method provides presenting a user with a first origin on which user login information is based, wherein the first origin is randomly selected from a plurality of possible origins. The method further provides, receiving first motion information from the user indicating a first position relative to the first origin that corresponds to a first element of the user login information. Upon receiving the user login information, the method provides determining whether the user login information authorizes the user to access the wearable computing system.

In some embodiments, the method provides, upon determining that the user login information authorizes the user to access the wearable computing system, allowing access to the wearable computing system by the user and, upon determining that the user login information does not authorize the user to access the wearable computing system, preventing the user from accessing the wearable computing system.

In some embodiments, the access is allowed for a predefined period of time after determining that the user login information authorizes the user to access the wearable computing system.

In some embodiments, the access is allowed until the user removes the wearable computing system.

In some embodiments, the method provides presenting the user with a second origin on which the user login information is based, wherein the second origin is randomly selected from the plurality of possible origins and receiving second motion information from the user indicating a second position relative to the second origin that corresponds to a second element of the user login information.

In some embodiments, the method provides receiving second motion information from the user indicating a second position relative to the first position that corresponds to a second element of the user login information.

In some embodiments, the method provides receiving input from the user indicating that the first motion information is complete.

In some embodiments, the method provides receiving input from the user indicating that the user login information is complete.

In some embodiments, presenting the user with the first origin comprises presenting the first origin to the first user such that the first origin is not presented to persons other than the first user.

In some embodiments, the plurality of possible origins comprises digits from 0 through 9, the first origin comprises one of the digits, the first element comprises one of the digits, the first position relative to the first origin comprises a number of digits in sequence between the first origin and the first element.

In another embodiment, a wearable computing system is provided. The wearable computing system includes a user interface configured to present a user with a first origin on which user login information is based, wherein the first origin is randomly selected from a plurality of possible origins. The user interface is further configured to receive first motion information from the user indicating a first position relative to the first origin that corresponds to a first element of the user login information. The wearable computing system further includes a processing system configured to determine whether the user login information authorizes the user to access the wearable computing system upon receiving the user login information.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

The ever shrinking size of computing systems, amount of power needed by those computing systems, batteries to supply that power, etc. has allowed computing systems to achieve form factors that can be worn by a person at almost all times if that person so desires. Headsets and watches are two of the more common form factors although other options are continually being designed. The size and configuration of these wearable form factors tends to require input options beyond the typical interfaces provided by desktop/laptop computers, tablets, smartphones, and the like. For example, while a smart watch may have a screen, that screen is likely too small to effectively type onto a displayed touch keypad. Likewise, a headset based system may only have one or two input buttons thereon for accepting input, which is far less than required by a typical keypad.

Like any computing system, a user of a wearable computing system likely desires some sort of security that inhibits access to the computing system by unauthorized users. While login information, such as a passcode, is commonly used to secure access to larger computing systems (e.g. laptops, tablets, smartphones, etc.), the interfaces provided by many wearable computing systems, as noted above, make entry of login information difficult. Moreover, even if a wearable computing system were to provide a voice type interface allowing the user to speak the login information, anyone positioned near enough to the user to hear the user's voice may be able to hear the login information. The wearable computing device provided below therefore allows a user to enter login information in a manner that makes it difficult if not impossible for others to glean the login information.

Figure 1:
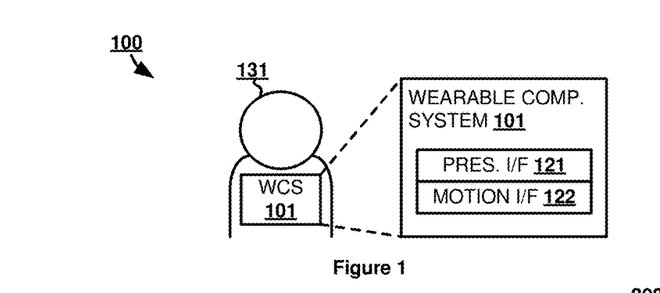
FIG. 1 illustrates a wearable computing environment for accessing a wearable computing system using randomized input origins.

FIG. 1 illustrates wearable computing environment 100 for accessing a wearable computing system using randomized input origins. Wearable computing environment 100 includes wearable computing system 101 and user 131. Wearable computing system 101 includes presentation interface 121 and motion interface 122.

In operation, user 131 carries or wears wearable computing system 101 on their person. Wearable computing system 101 may take the form of a headset, eyeglasses, watch, bracelet, or some other form factor capable of being carried by user 131. Wearable computing system 101 may be an independent device or may rely, at least in part, on another device. For example, wearable computing system 101 may be used to display notifications generated by applications on another system (e.g. a smart watch displaying message notifications for messages received by a smartphone). Wearable computing system 101 may therefore include wired or wireless communication interfaces, such as interfaces using Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. In some cases, wearable computing system 101 may be an interface for another computing system. For example, wearable computing system 101 may be a virtual reality headset component for a gaming system. In those cases, access gained to wearable computing system 101 may also comprise access gained into the other computing system.

Figure 2:
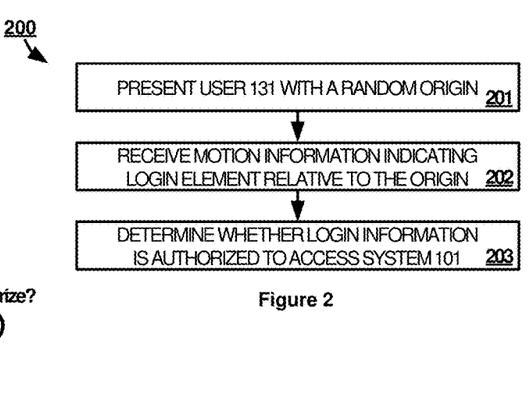
FIG. 2 illustrates an operational scenario for the wearable computing environment to access a wearable computing system using randomized input origins.

FIG. 2 illustrates a method 200 in an operational scenario for wearable computing environment 100 to access wearable computing system 101 using randomized input origins. In method 200, user 131 is presented with an origin randomly selected from multiple possible origins (step 201). The origin may be presented to user 131 visually, audibly, tactually, or some other way of presenting information to a user—including combinations thereof. The origin may be one of many possible characters that could make up login information for wearable computing system 101. For example, if the characters are letters of the alphabet, then the origin may be a randomly selected one of the letters. Alternatively, the origin may comprise an arrangement of possible characters. For example, at least a portion of the possible characters may be displayed to user 131 at various positions in the display or relative to one another. Different origins will have different arrangements.

Method 200 further provides that motion information is received from user 131 indicating a position relative to the origin that corresponds to an element of user login information (step 202). The motion information may comprise movement of wearable computing system 101 itself, which may correspond to a body part of user 131 to which wearable computing system 101 is affixed. For example, a bracelet form factor would cause wearable computing system 101 to move in conjunction with wrist and arm movements of user 131. Likewise, a headset form factor would cause wearable computing system 101 to move in conjunction with head and neck movements of user 131. Alternatively, the motion information may comprise motion captured by wearable computing system 101 or some system in communication with wearable computing system 101, such as hand movements, eye movements, etc. This captured motion information may be used on its own or in conjunction with motion information of wearable computing system 101 itself.

The user login information may include a username, passcode, or some other type of information needed for wearable computing system 101 to authorize access to wearable computing system 101. The user login information may comprise just the one element indicated by step 202 or may comprise multiple elements. Each element may comprise one or more characters of the login information. The ability of the motion information to indicate a position of the element may require user 131 to know of each elements relative position if those relative positions are not presented to user 131. For example, if the origin is a random letter of the alphabet, then user 131 may be expected to know that the relative positions are listed alphabetically or user 131 may be presented with information indicating that the elements are alphabetical. Expanding upon that example, if the origin is the letter "M" and the element is the letter "R," then R is five letters away from M in the alphabet. The motion information will therefore indicate five positions further down the alphabet. To make such an indication, the motion information may indicate five repeated motions (e.g. five head tilts, hand swipes, etc.), may indicate that a particular motion was held for a period of time (e.g. five seconds with each second corresponding to a position further down the alphabet), or may use some other convention. In other examples where multiple elements are arranged on a display as the origin, the motion information may indicate the position of the element relative to that origin. For instance, if a desired element is in the upper-left corner of the display, then the motion information may indicate up and to the left.

Upon receiving the user login information, method 200 determines whether the user login information authorizes user 131 to access wearable computing system 101 (step 203). In some cases, the single element obtained by step 202 may comprise the entirety of the user login information. However, in other cases, the element obtained by step 202 may only be a portion of the user login information. In those cases, step 202 may need to be repeated to obtain additional elements before step 203 can determine whether the user login information authorizes user 131 to access wearable computing system 101. Any method of determining whether the user login information authorizes access for user 131 may be used. For example, a method of authorizing user login information that was entered in a traditional manner, such as using a keypad, may also be used for the user login information obtained using the motion information described above. In some cases, wearable computing system 101 may make the determination on its own while in other cases wearable computing system 101 may be assisted by one or more other systems (e.g. using a network based authentication system).

If the user login information authorizes user 131 to access wearable computing system 101, then wearable computing system 101 allows user 131 to access wearable computing system 101. With access to wearable computing system 101, user 131 is able to use whatever functions of wearable computing system 101 that is authorized by the user login information. In some cases, the access may include access to less than the full amount of wearable computing system 101's functions. The access may be governed by a time period after which user 131 must be reauthorized (e.g. immediately or some number of minutes after last use of wearable computing system 101), may be revoked when wearable computing system 101 is removed or taken off of user 131's person, revoked (or locked) at the direction of user 131 (e.g. pressing a lock button on wearable computing system 101), or some other way of limiting the duration of access to wearable computing system 101.

If the user login information does not authorize user 131 to access wearable computing system 101, then wearable computing system 101 prevents or otherwise does not allow user 131 to access wearable computing system 101. User 131 may then be given the option to repeat method 200 in order to retry gaining access into wearable computing system 101. After a number of failed attempts, user 131 may be prevented from attempting to access wearable computing system 101 again.

In some examples, the access to wearable computing system 101 comprises access to wearable computing system 101 as a whole. For instance, user 131 may not be able to access any element of wearable computing system 101's operating software (or any element beyond basic features such as emergency calling) without providing valid user login information. In alternative examples, the access to wearable computing system 101 comprises access to one or more individual applications. One specific example may occur to authorize user 131 for access to an email application executing on wearable computing system 101. Thus, even if user 131 already has access to other applications and features of wearable computing system 101, wearable computing system 101 would perform method 200 to determine whether user 131 is authorized to access the email application. Moreover, in some examples, user 131 may be required to provide user login information both when accessing wearable computing system 101 as a whole and when accessing the one or more individual applications. The user login information may be different for wearable computing system 101 as a whole and each individual application.

By using motion information to indicate digits from a random origin, as long as the origin is presented in a manner that cannot be seen by other people, those other people will not be able to ascertain the user login information from the motions of user 131. However, in some situations, user 131 may be located in an environment where they are not concerned about other people figuring out their user login information (e.g. an empty room or a room with trusted people) and is suited to receive audio input (e.g. low background noise level). For those situations, wearable computing system 101 may provide alternative means for entering the user login information. For instance, wearable computing system 101 may allow for voice entry from user 131. Thus, if user 131 is comfortable doing so, user 131 may be able to speak the user login information rather than providing motion information (or may provide some combination thereof). This spoken input may provide elements of the user login information relative to the origin or may instead explicitly provide the elements.

Figure 3:
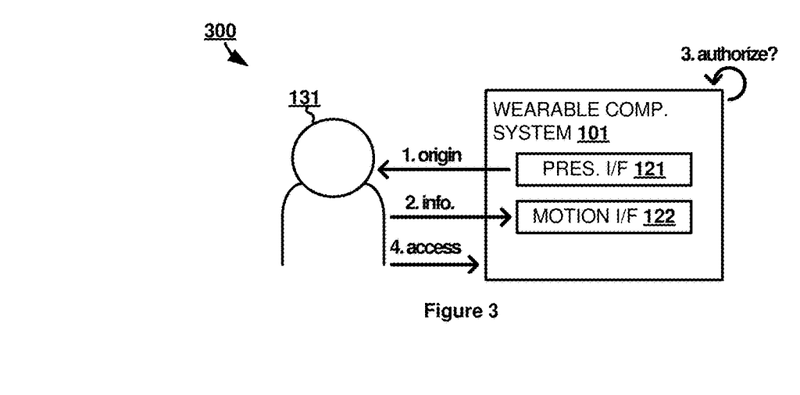
FIG. 3 illustrates an operational scenario for the wearable computing environment to access a wearable computing system using randomized input origins.

FIG. 3 illustrates operational scenario 300 for wearable computing environment 100 to access wearable computing system 101 using randomized input origins. At step 1, presentation interface 121 presents an origin to user 131. Presentation interface 121 may include one or more displays (e.g. opaque, transparent, projected, or otherwise), speakers, vibrating elements, lights, or some other type of component that can convey information to a user—including combinations thereof. Accordingly, the origin may be presented to user 131 in a visual manner, audible manner, tactile manner, or in some other manner of conveying information—including combinations thereof. For example, the origin may be "spoken" to user 131 through speakers instead of or in addition to displaying the origin to user 131.

At step 2, motion interface 122 receives motion information indicating a position relative to the origin of an element of user login information. Motion interface 122 may include one or more accelerometers, gyroscopes, cameras, eye tracking sensors, or some other type of component capable of sensing motion—including combinations thereof. Motion interface 122 may also (or instead) include a communication interface for receiving motion information captured by devices external to wearable computing system 101, such as room camera or gesture sensor.

In some examples, steps 1 and 2 repeat multiple times in order to provide multiple elements of the user login information. Additional motion information may be received signifying that the motion information indicating the element has completed and that motion information indicating a next element is forthcoming. In response to that additional motion information, steps 1 and 2 repeat to receive that next element. Similarly, once all elements of the user login information are provided, further motion information may be received indicating that the user login information is complete and, hence, user 131 is finished providing elements of the user login information. In some embodiments, rather than using motion information, user 131 may use other user interface elements such as hardware or software based buttons to indicate that a next element is to be entered or that the user login information is complete.

At step 3, wearable computing system 101 determines whether the received user login information allows user 131 to access wearable computing system 101. For example, if the user login information includes a username and passcode, then the passcode must match a stored passcode for the username in order for user 131 to be allowed access. In some examples, only a passcode, such as a personal identification number (PIN), may be needed to match a preset PIN in wearable computing system 101. Regardless of the method used to determine whether the user login information authorizes user 131 to access wearable computing system 101, if authorized, user 131 is allowed to access functionality of wearable computing system 101.

Figure 4:
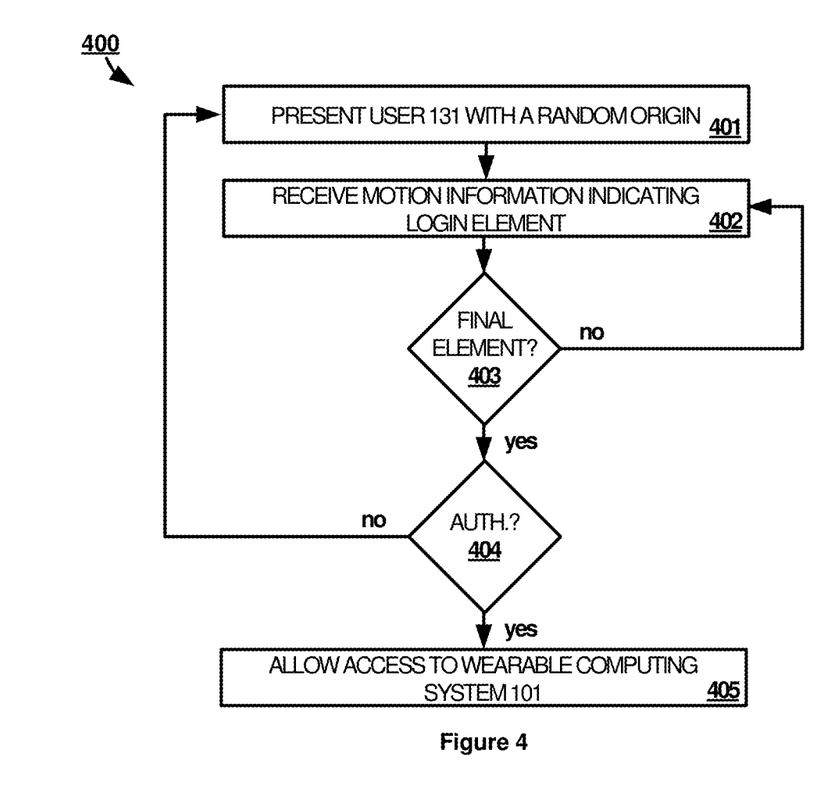
FIG. 4 illustrates an operational scenario for the wearable computing environment to access a wearable computing system using randomized input origins.

FIG. 4 illustrates operational scenario 400 for wearable computing environment 100 to access wearable computing system 101 using randomized input origins. In scenario 400, user 131 is presented with a random origin by wearable computing system 101 (step 401). Once user 131 is aware of the origin, user 131 provides motion input that is received by wearable computing system 101 as motion information to indicate a first element of user login information (step 402). The first element may include one or more characters that make up the user login information. Thus, in some embodiments, each element indicated by the user may include multiple characters. For instance, a selection of character pairings may be provided by the origin and the motion input indicates one of those pairings.

After providing the first element, wearable computing system 101 determines whether there are additional elements to be entered to complete the user login information (step 403). This determination may be made by receiving additional input (motion or otherwise) from user 131 indicating whether or not another element is to be provided, by determining that the number of elements already entered do or do not yet satisfy a required number of elements for user login information, or by some other way of establishing that the user login information is or is not complete—including combinations thereof. If wearable computing system 101 determines that additional elements are to be entered, wearable computing system 101 returns to step 402 whereby additional motion input from user 131 provides additional motion information to wearable computing system 101 indicating the next element of the user login information. When returning to step 402, the additional motion information may indicate the next element relative to the originally displayed origin or may indicate the next element relative to the element indicated in the immediately preceding iteration of step 402 (e.g. as may be the case if the motion information scrolled through possible elements). Alternatively, wearable computing system 101 may return to step 401 wherein a new randomly selected origin is provided as a basis for the motion information indicating the next element.

Once step 403 has determined that no additional elements are to be entered for the user login information, wearable computing system 101 determines whether the login information authorizes user 131 to access wearable computing system 101 (step 404). If user 131 is allowed to access wearable computing system 101, then wearable computing system 101 allows user 131 to access the functions authorized by the user login information. However, if the user login information does not allow access to user 131, wearable computing system 101 returns to step 401. Upon returning to step 401, the user login information may be cleared so that user 131 must start from the first element to retry providing the user login information. The user login information may not authorize user 131 to access wearable computing system 101 because user 131 provided one or more of the user login information's elements incorrectly, because the user login information is not correct for wearable computing system 101, or for some other reason that the user login information would not authorize user 131 to access wearable computing system 101.

Figure 5:
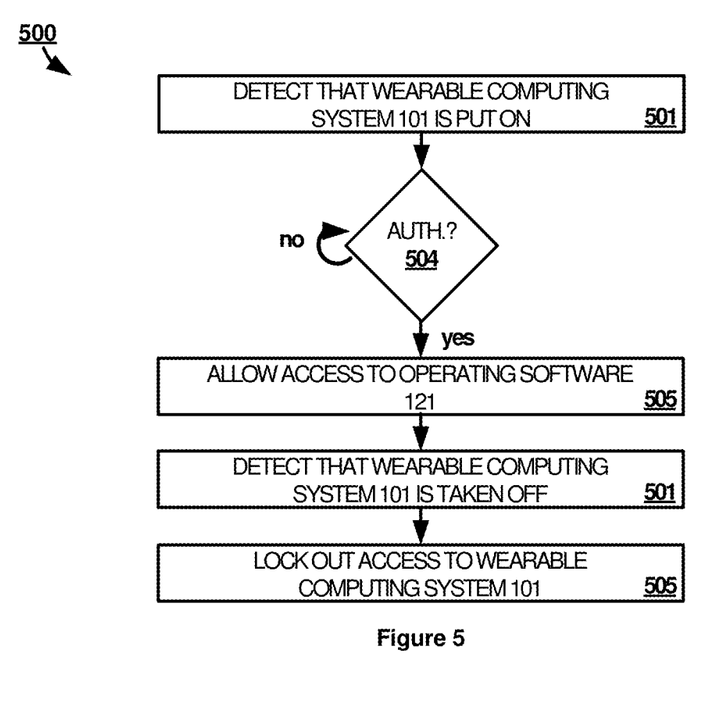
FIG. 5 illustrates an operational scenario for the wearable computing environment to access a wearable computing system using randomized input origins.

FIG. 5 illustrates operational scenario 500 for wearable computing environment 100 to access wearable computing system 101 using randomized input origins. In scenario 500, wearable computing system 101 detects that wearable computing system 101 has been put on by user 131 (step 501). For example, if wearable computing system 101 uses a eyeglasses form factor, then wearable computing system 101 detects that wearable computing system 101 was placed on user 131's face. The detection may be performed based on information from proximity sensor of wearable computing system 101, information from a contact switch of wearable computing system 101, or some other way by which a wearable computing system may detect that the wearable computing system was put on—including combinations thereof.

In response to being put on, wearable computing system 101 performs one of the methods or operational scenarios presented above to determine whether user 131 is authorized to access wearable computing system 101 (step 502). If user 131 is not authorized, then step 502 may repeat to allow user 131 to retry providing user login information. However, if user 131 is authorized, then wearable computing system 101 allows user 131 to access wearable computing system 101 (step 503). In this example, user 131 is allowed to access wearable computing system 101 without having to perform step 502 again as long as user 131 continues to wear wearable computing system 101.

At some point after user 131 is allowed to access wearable computing system 101, user 131 removes wearable computing system 101 from their person and wearable computing system 101 detects that wearable computing system 101 has been taken off (step 504). The same type of sensor information that was used to detect that wearable computing system 101 was put on by user 131 may also be used to detect that wearable computing system 101 is taken off. Although, different types of sensor information may be used instead. Regardless, upon detecting that wearable computing system 101 has been taken off, wearable computing system 101 locks out access to wearable computing system 101's functionality (step 204). Therefore, when user 131 or any other user puts wearable computing system 101 back on, wearable computing system 101 will repeat scenario 500 to authorize that user to access the device.

Figure 6:
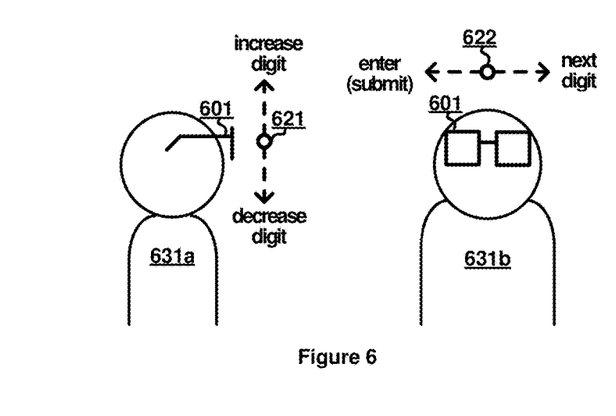
FIG. 6 illustrates an example positioning of a wearable computing system to access the wearable computing system using randomized input origins.

FIG. 6 illustrates an example positioning of wearable computing system 601 to access the wearable computing system using randomized input origins. Wearable computing system 601 is an example of wearable computing system 101 in a headset or eyeglasses type form factor. Wearable computing system 601 is worn by user 631 in this example. User 631 is shown in profile (631a) and in straight on (631b) views. Additionally, in relation to the two perspectives of user 631, arrows 621 and 622 are provided to indicate how motions will be interpreted in relation to wearable computing system 601. In this example, integer digits are used as the elements of user login information for wearable computing system 601. Therefore, as shown by arrow 621, an upward motion will increase the digit and a downward motion will decrease the digit. The upward motion could comprise user 631 tilting their head up, user 631 moving their eyes to look upward, user 631 making a hand gesture in an upward direction, or some other upward type motion—including combinations thereof. The downward motion may comprise similar motions that are instead in a downward direction. Additionally, as shown by arrow 622, a motion to user 631's right enters user login information (i.e. submits the user login information for authorization) and a motion to user 631's left indicates that the motion(s) for the current digit has been completed and a new digit is to be entered. Like with the upward and downward motions, the left and right motions may comprise head tilts, head turns, left/right eye movements, left/right hand movements, or some other type of left/right motion—including combinations thereof.

Figure 7:
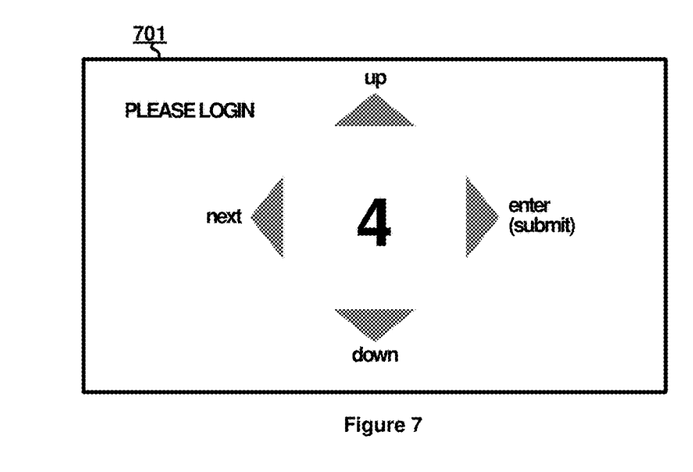
FIG. 7 illustrates an example display by a wearable computing system to access the wearable computing system using randomized input origins.

FIG. 7 illustrates display 701 in an example of what may be presented wearable computing system 601 to access wearable computing system 601 using randomized input origins. Display 701 may be opaque in that only items displayed by display 701 can be seen by user 631 or may be transparent in that user 631 can also view at least a portion of user 631's surrounding environment through display 701. In this example, display 701 asks user 631 to login to wearable computing system 601 and presents a randomly selected origin digit 4 of the digits 0-9. Display 701 further provides user 631 with basic indicators of what types of motion will have what effect on wearable computing system 601. Specifically, the up/down and left/right motions described in relation to arrows 621 and 622. However, in some examples, more or less information may be provided to user 631 by display 701 along with the origin.

User 631's user login information is a PIN set at 7264 for this example. Therefore, the first element of user 631's PIN is three positions away from the origin of 4. Head nods and head turns are the motions that correspond to the options presented by display 701. By nodding their head up and then back to level three times, the motion information captured by wearable computing system 601 indicates three digits upward from origin 4. Motion information captured by wearable computing system 601 from user 631 turning their head to the left indicates that the motion information for the first element of the PIN (the digit 7) is complete and so that user 631 can begin providing motion information for the next digit. In some examples, display 701 may change based on the motion information received to indicate to user 631 that the motion information was received and confirm how the motion information was interpreted by wearable computing device 631. For example, for each of user 631's upward nods to indicate the digit 7, the up arrow on display 701 may highlight and the displayed digit may increase (i.e. from 4 to 5 to 6 and then 7). In that way, user 631 is informed of their progress towards the desired input digit. In other similar examples, user 631 may not need to nod upward for each digit. Rather, user 631 may be able to keep their head in an upward position as display 701 increases the digits and then returns their head to level once the desired digit 7 is reached. Additionally, display 701 may display the already entered digits of the PIN as user 631 provides motion information so that user 631 is aware of their progress.

After user 631 has entered the digit 7 by turning their head to the left, user 631 provides motion information for the digit 2. Before user 631 begins providing motion information to designate the digit 2, display 701 may return to displaying the original origin of 4, may select a new random origin, or may continue from the previous digit entered, which in this case would be 7. In this example, display 701 returned to displaying the origin 4. Therefore, to enter the digit 2, user 631 nods their head downward and back to normal two times before turning left to move onto providing the third digit. It should be understood that, if the motion information indicates going down in digits below 0 or up in digits above 9, then the digits may either circle back around (e.g. going down from 0 back to 9 or going up from 9 back to 0) or may simply remain on 0 or 9 and not allow input to go below or above those respective digits.

After the digit 2 has been entered, user 631 similarly nods upward twice to indicate the digit 6 from the origin of 4 and turns left to indicate that the next digit will be entered. Now user 631 only needs to enter one final digit 4 into wearable computing device 631. Since 4 is also the origin, the digits do not need to be increased or decreased. Therefore, user 631 turns their head to the right to confirm 4 as the last digit of the PIN and submit the PIN for authorization. In some examples, user 631 may need to first turn their head left to enter 4 as the digit and then turn right to submit the PIN for authorization. Regardless, since user 631 has entered their correct PIN 7264, user 631 is allowed to access wearable computing device 631.

Advantageously, presenting user 631 with a random origin on display 701 that cannot be seen by others means that no one but user 631 will know the origin from which the motion information indicates the PIN digits. Thus, for example, when someone else sees user 631 nod their head upward three times, that person does not know what digit the upward nods are based upon and, consequently, will not know what digit is being indicated by user 631. This allows user 631 to enter their PIN in plain view of other people without those people being able to determine the PIN. Moreover, as noted above, wearable computing system 601 may accept alternative input should user 631 desire. Therefore, if the alternative input comprises voice input, user 631 may instead simply say "up" or "down" instead of providing motion input. This would maintain the anonymity of user 631's PIN when other people can still hear what user 631 is speaking. Alternatively, if user 631 is not concerned with other people being able to hear the PIN, user 631 may simply speak "7264."

Figure 8:
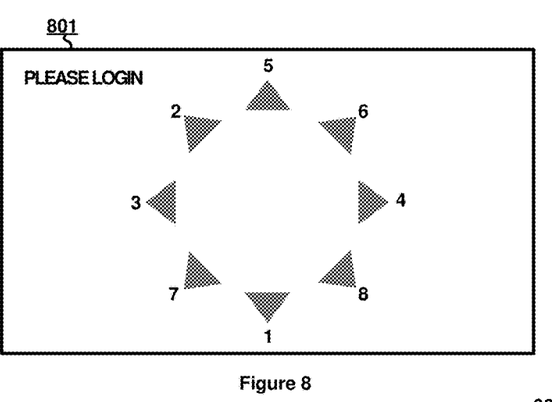
FIG. 8 illustrates an example display by a wearable computing system to access the wearable computing system using randomized input origins.

FIG. 8 illustrates display 801 in another example of what may be presented by wearable computing system 601 to access wearable computing system 601 using randomized input origins. In this example, the possible digits are 1-8 and user 631's PIN is still 7264. Alternatively, the possible digits may be 0-9 but wearable computing system 601 did not include those in this origin because only 8 digit spots are provided. If user 631's PIN included a 0 or a 9, then an origin including either or both of those digits and not including digits that are not in user 631's PIN would be selected instead. To provide their PIN with respect to the origin displayed by display 801, user 631 is able to nod or turn their head in 8 different directions instead of the four different directions provided by arrows 621 and 622 in the example above. To avoid input errors, user 631 may need to hold in a certain position for an amount of time (e.g. 1 second) while a digit/arrow is highlighted before that digit is entered as part of the PIN. This allows user 631 to adjust their movement to select the correct digit if necessary.

Accordingly, to enter user 631's PIN, user 631 first nods their head down and to the left to provide the motion information corresponding to the digit 7. User 631 then nods up and to the left for the digit 2, nods up and to the right for the digit 6, and turns to the right for digit 4. Since there is no motion for entering or submitting the final PIN in this example, wearable computing device 631 determines whether the PIN is authorized upon receiving the fourth digit. In other examples, the origin may change between digit entries to further ensure onlookers cannot determine the digits being selected by user 631's head movements. For example, after entering the digit 7, the origin may change so that the numbers are in different positions. Thus, in the origin subsequent to entering the digit 7, the digit 2 may be in a different position and require a movement other than up and to the left to be indicated by the motion information.

Figure 9:
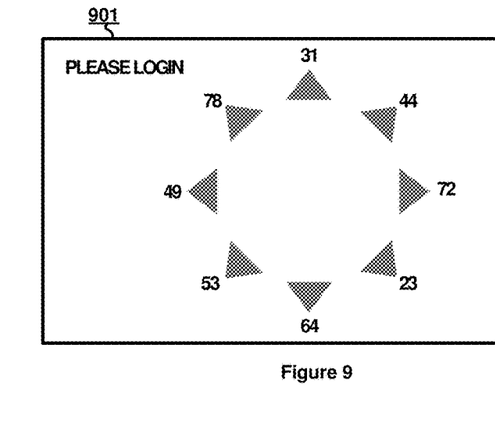
FIG. 9 illustrates an example display by a wearable computing system to access the wearable computing system using randomized input origins.

FIG. 9 illustrates display 901 in another example of what may be presented by wearable computing system 601 to access wearable computing system 601 using randomized input origins. In this example, user 631's PIN is still 7264. Each element of user 631's PIN includes two digits instead of just one. Specifically, the origin displayed by display 901 includes the two digit sequences of user 631's PIN, 72 and 64, while showing random other digit sequences in the remaining spots. To enter their PIN, user 631 therefore turns their head to the right and then nods their head downward to provide motion information corresponding to 72 and then 64. In alternative examples, the origin may change after entering a digit sequence. Thus, 64 may not be displayed in the first origin but is displayed in the second origin, which is presented after motion information indicating 72 is received.

It should be understood that the above examples could also apply to characters other than digits, such as letters of the alphabet. Moreover, while wearable computing system 601 takes a glasses type form factor in the above example, other form factors could use similar input techniques. For example, if wearable computing system 601 took a watch or bracelet type form factor, then wrist movements instead of head movements would be used to provide motion information (e.g. a wrist turn in one direction increased the digit while a wrist turn in the other direction decreases the digit).

Figure 10:
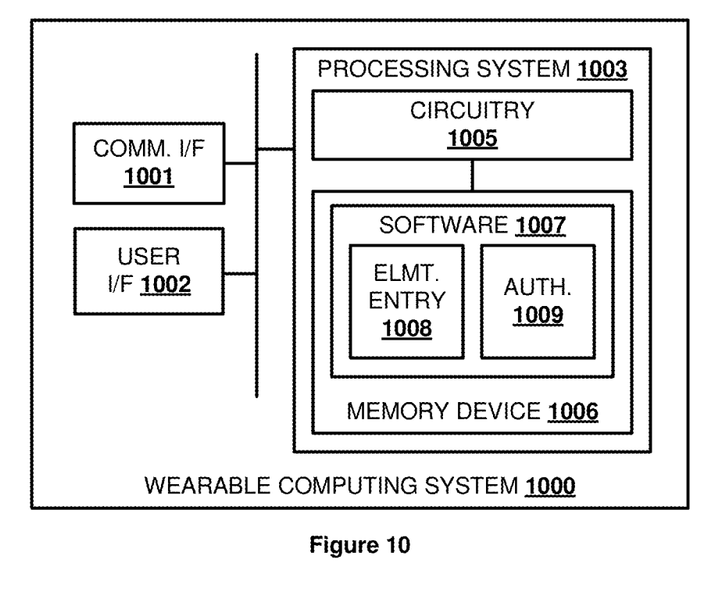
FIG. 10 illustrates a wearable computing device for accessing a wearable computing system using randomized input origins.

FIG. 10 illustrates wearable computing system 1000. Wearable computing system 1000 is an example of wearable computing system 101, although system 101 could use alternative configurations. Wearable computing system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007. Wearable computing system 1000 may include other well-known components such as a battery and enclosure that are not shown for clarity. Wearable computing system 1000 may be a personal computer, tablet, application server, conferencing system, private branch exchange, or some other computing apparatus—including combinations thereof. In some examples, wearable computing system 1000 may be replicated across multiple locations in order to distribute the processing load required to function as described herein.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

User interface 1002 comprises components that interact with a user to receive user inputs and to present media and/or information. User interface 1002 may include one or more accelerometers, gyroscopes, eye tracking sensors, or other type of component capable of sensing motion—including combinations thereof. User interface 1002 may further include a speaker, microphone, buttons, lights, display screen, touch screen, touch pad, scroll wheel, communication port, or some other user input/output apparatus—including combinations thereof. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Processing circuitry 1005 is typically mounted on a circuit board that may also hold memory device 1006 and portions of communication interface 1001 and user interface 1002. Operating software 1007 comprises computer programs, firmware, or some other form of machine-readable processing instructions. Operating software 1007 includes element entry module 1008 and authorization module 1009. Operating software 1007 may further include an operating system, utilities, drivers, network interfaces, applications, or some other type of software. When executed by processing circuitry 1005, operating software 1007 directs processing system 1003 to operate wearable computing system 1000 as described herein.

In particular, element entry module 1008 directs processing system 1003 to present a user with a first origin on which user login information is based, wherein the first origin is randomly selected from a plurality of possible origins. Element entry module 1008 further directs processing system 1003 to receive first motion information from the user indicating a first position relative to the first origin that corresponds to a first element of the user login information. Upon receiving the user login information, authorization module 1009 directs processing system 1003 to determine whether the user login information authorizes the user to access wearable computing system 1000.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of accessing a wearable computing system using randomized input origins for user login, the method comprising:

presenting a user with a first origin on which user login information is based, wherein the first origin is randomly selected from a plurality of possible origins and wherein each origin of the plurality of possible origins indicates to the user a plurality of possible positions, relative to the origin, that each correspond to a possible element of the user login information;

receiving first motion information from the user indicating a first position relative to the first origin that corresponds to a first element of the user login information, wherein the first element comprises a first character of a passcode included in the login information and the first character is displayed at the first position; and upon receiving the user login information, determining whether the user login information authorizes the user to access the wearable computing system.

2. The method of claim 1, further comprising:
upon determining that the user login information authorizes the user to access the wearable computing system, allowing access to the wearable computing system by the user; and
upon determining that the user login information does not authorize the user to access the wearable computing system, preventing the user from accessing the wearable computing system.

3. The method of claim 2, wherein the access is allowed for a predefined period of time after determining that the user login information authorizes the user to access the wearable computing system.

4. The method of claim 2, wherein the access is allowed until the user removes the wearable computing system from their person.

5. The method of claim 1, further comprising:
presenting the user with a second origin on which the user login information is based, wherein the second origin is randomly selected from the plurality of possible origins; and
receiving second motion information from the user indicating a second position relative to the second origin that corresponds to a second element of the user login information.

6. The method of claim 1, further comprising:
receiving second motion information from the user indicating a second position relative to the first position that corresponds to a second element of the user login information.

7. The method of claim 1, further comprising:
receiving input from the user indicating that the first motion information is complete.

8. The method of claim 1, further comprising:
receiving input from the user indicating that the user login information is complete.

9. The method of claim 1, wherein presenting the user with the first origin comprises presenting the first origin to the first user such that the first origin is not presented to persons other than the first user.

10. The method of claim 1, wherein the plurality of possible origins comprises digits from 0 through 9, the first origin comprises one of the digits, the first element comprises one of the digits, the first position relative to the first origin comprises a number of digits in sequence between the first origin and the first element.

11. A wearable computing system accessible using randomized input origins for user login, the wearable computing system comprising:
a user interface configured to present a user with a first origin on which user login information is based, wherein the first origin is randomly selected from a plurality of possible origins and wherein each origin of the plurality of possible origins indicates to the user a plurality of possible positions, relative to the origin, that each correspond to a possible element of the user login information, and receive first motion information from the user indicating a first position relative to the first origin that corresponds to a first element of the user login information, wherein the first element comprises a first character of a passcode included in the login information and the first character is displayed at the first position; and a processing system configured to determine whether the user login information authorizes the user to access the wearable computing system upon receiving the user login information.

12. The wearable computing system of claim 11, further comprising:
the processing system configured to allow access to the wearable computing system by the user upon determining that the user login information authorizes the user to access the wearable computing system and prevent the user from accessing the wearable computing system upon determining that the user login information does not authorize the user to access the wearable computing system.

13. The wearable computing system of claim 12, wherein the access is allowed for a predefined period of time after determining that the user login information authorizes the user to access the wearable computing system.

14. The wearable computing system of claim 12, wherein the access is allowed until the user removes the wearable computing system from their person.

15. The wearable computing system of claim 11, further comprising:
the user interface configured to present the user with a second origin on which the user login information is based, wherein the second origin is randomly selected from the plurality of possible origins, and receive second motion information from the user indicating a second position relative to the second origin that corresponds to a second element of the user login information.

16. The wearable computing system of claim 11, further comprising:
the user interface configured to receive second motion information from the user indicating a second position relative to the first position that corresponds to a second element of the user login information.

17. The wearable computing system of claim 11, further comprising:
the user interface configured to receive input from the user indicating that the first motion information is complete.

18. The wearable computing system of claim 11, further comprising:
the user interface configured to receive input from the user indicating that the user login information is complete.

19. The wearable computing system of claim 11, wherein the user interface configured to present the user with the first origin comprises:
the user interface configured to present the first origin to the first user such that the first origin is not presented to persons other than the first user.

20. The wearable computing system of claim 11, wherein the plurality of possible origins comprises digits from 0 through 9, the first origin comprises one of the digits, the first element comprises one of the digits, the first position relative to the first origin comprises a number of digits in sequence between the first origin and the first element.

* * * * *